UNITED STATES PATENT OFFICE.

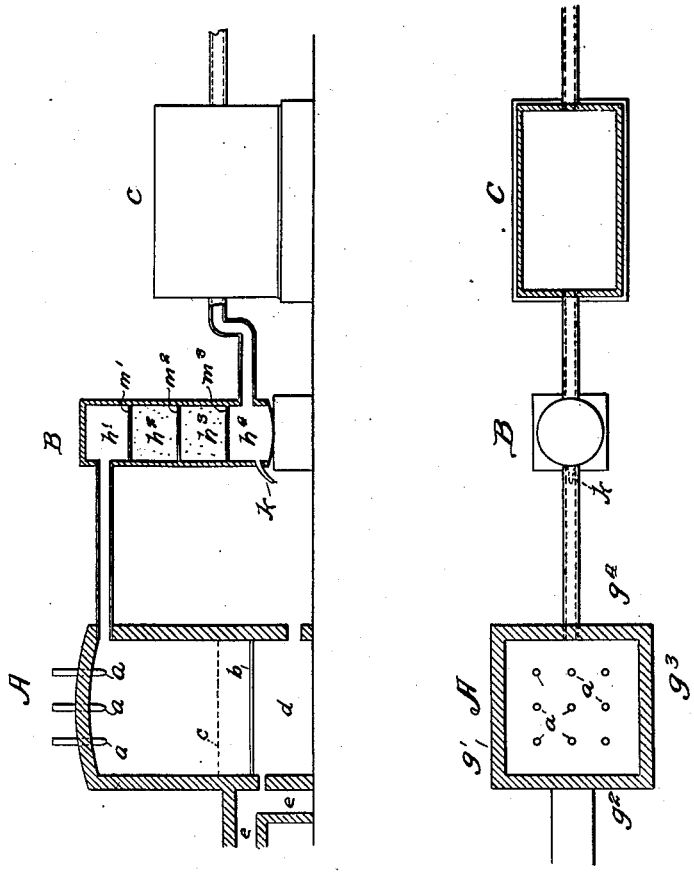

JOHN S. BLOWSKI AND ALFRED A. BLOWSKI, OF OAKLAND, CALIFORNIA.

PROCESS FOR THE TREATMENT OF SULFURIC-ACID RESIDUES.

1,186,373. Specification of Letters Patent. Patented June 6, 1916.

Application filed January 30, 1915. Serial No. 5,299.

*To all whom it may concern:*

Be it known that we, JOHN S. BLOWSKI and ALFRED A. BLOWSKI, citizens of the United States, residing at Oakland, in the county of Alameda and State of California, have invented certain new and useful Improvements in Processes for the Treatment of Sulfuric-Acid Residues; and we do hereby declare the following to be a full, clear, and exact description of the invention, such as will enable others skilled in the art to which it appertains to make and use the same.

Our invention has reference to improvements in processes for the recovery of sulfuric acid and more particularly for the recovery of sulfuric acid used in the refining of petroleum.

As we have stated in the specifications of our patent of November 28th, 1911, No. 1,010,221, the treatment of petroleum distillate with sulfuric acid or with sulfuric anhydrid produces a sludge, which consists largely of sulfuric acid chemically combined with tarry and other organic matters. For the recovery of the sulfuric acid from this sludge, it has been customary to treat it with steam or water in lead-line retorts. This treatment results in the separation of the sludge into a tarry mass and a dilute and impure sulfuric acid which settles out at the bottom. This impure acid usually termed "weak acid" or "sludge acid" has hitherto been concentrated in lead and iron pans before being again used, but this process for the recovery of the sulfuric acid has been found unsatisfactory for the following reasons:—A considerable part of the sulfur values contained in the original acid has escaped into the atmosphere as sulfur dioxid during the treatment of the petroleum and of the sludge owing to a variety of reactions and again during the concentration of the sludge acid, in the latter case owing primarily to reduction by the organic matter that is present. The acid recovered by this process has been largely contaminated with tarry matters, the final product being black and unsalable for most purposes. In said United States Patent No. 1,010,221, we have shown a novel process for decomposing sludge acid by heating same in the presence of organic matter so as to produce sulfur dioxid. This process is particularly applicable in instances where it is desired to convert the sulfur values existing in the sludge acid referred to, into sulfur trioxid or sulfuric anhydrid, or what is technically known as "fuming sulfuric acid," although the hydrated sulfuric acid of less than monohydrate strength, such as is produced by the well known "chamber process," may be also produced through the agency of this process, by treating the gas obtained by the decomposing process, in an appropriate manner.

In some instances it is of advantage to produce directly, a hydrated sulfuric acid, without the preliminary conversion of the sulfur value of the sludge acid into sulfur dioxid, and we have invented certain new and useful improvements, whereby a considerable portion of the sulfur values existing in the sludge acid may be directly obtained in the form of a hydrated sulfuric acid.

The complete decomposition of sulfuric acid by organic matter, according to our previous patent, resulting in the production of sulfur dioxid, necessarily involves contact between the acid and the organic matter referred to, of sufficient duration to allow the required chemical reduction of the acid to take place.

We have found that if, instead of giving the sludge acid undergoing treatment the duration of contact with the organic matter necessary to completely reduce the sulfuric acid existing in the sludge acid to sulfur dioxid, the sludge acid be submitted to rapid distillation, so as to reduce the time factor of the treatment and minimize the time of contact between the sulfuric acid and the organic matter existing in the sludge acid, a considerable portion of the sulfuric acid contained in said sludge acid may be directly converted into vapor, which latter may then be condensed as hydrated or ordinary sulfuric acid, leaving such sulfur dioxid as is produced by the decomposition necessarily accompanying such distillation, to be treated according to the provisions of our Patent No. 1,010,221 or in any other manner. This rapid distillation is effected by maintaining a temperature not less than the boiling point of sulfuric acid, and by so regulating the supply of sludge acid that the hearth is kept in a nearly dry condition, no body of liquid being allowed to accumulate so as to digest, with consequent decomposition.

Our process consists in the treatment of the sludge with steam or water, as heretofore, with the production of a "weak acid" or "sludge acid," the exposure of said sludge acid to a temperature at or above the boiling point of sulfuric acid whereby a portion of the sulfuric acid contained in said sludge acid is quickly vaporized, the rapid removal of the resulting acid vapors from contact with the carbonaceous or organic residuum of the distillation, and the subsequent condensation of the acid vapors as hydrated or ordinary sulfuric acid.

In the initial treatment of the sludge, an amount of water either in the form of cold water or steam equal to about fifty per cent. in volume of the amount of sludge treated is added to the sludge. After the separation of the sludge acid which consists principally of diluted acid with some organic matter, said sludge acid is rapidly and highly heated, and the vapors are rapidly withdrawn, so as to effect a quick vaporization and removal from the retort without decomposition of as much as possible of the sulfuric acid contained in said sludge acid. The sulfuric acid vaporized is then condensed, while the sulfur dioxid produced by the decomposition necessarily accompanying the distillation above mentioned, may be treated according to the provisions of Patent No. 1,010,221, or in any other manner.

To carry out the process hereinbefore described, we show an apparatus by means of which the objects of this patent may be carried out.

Figure 1 shows in outline an elevation partly in section of such an apparatus, Fig. 2 being a plan thereof also partly in section.

The sludge acid is introduced into the decomposing chamber or retort A in small streams, through the pipes $a$, dropping on the iron or fire tile hearth $b$. This hearth may consist of a plate or of several smaller plates laid upon foundation walls $g^1$, $g^2$, $g^3$, $g^4$, of brick or other suitable material, with walls of suitable material built upward from it and terminating in a roof, so as to form a closed chamber; or it may consist of a square and basin-like vessel of wrought iron or cast iron or other material, having the bottom and sides of one piece, extending upward for a distance to the ledge $c$, where it may meet and be flanged to the upper part of the chamber or retort. The sides of the basin-like vessel, or in any event of the decomposing chamber or retort A, are provided with doors not shown close to the bottom or hearth, allowing access to the interior, and permitting any scraping or cleaning of the hearth during operation. The hearth $b$ is kept hot by a fire from oil or other fuel, burning in the combustion chamber $d$, which leads to the flue $e$. The residue from the hearth, consisting of carbonaceous or other matter resulting from the treatment, may be periodically removed through the doors on the sides.

Particular care is given, in the construction of the retort A, toward the conserving of all possible heat in the upper portion, and all unheated parts, by the enveloping of same with an asbestos, kieselguhr or other insulating blanket or envelop, so that any acid vaporized may be enabled to leave the retort at once, instead of condensing and being again subjected to the reducing process by the organic matter remaining in the bottom of the chamber or retort.

The sulfuric acid vaporized, together with the water vapor and any other products of vaporization or of decomposition, travels into the filter tower B, made of terra-cotta or other suitable material, and kept suitably insulated from the atmospheric temperature, if desired, so as to prevent undue condensation of any of the vaporized substances. This tower is inserted in the system for the purpose of filtering the vapors and gases from any carbonaceous or other solid matter that may be mechanically carried over by the moving current of gas, and may consist of sections as $h^1$, $h^2$, $h^3$ and $h^4$, of which $h^2$ and $h^3$ are filled with coke or pumice stone, or other similar porous material, the several sections being separated by perforated terra cotta plates $m^1$, $m^2$ and $m^3$. The filter tower is also provided with a draw-off pipe $k$, by means of which any acid or other vapors condensed within it instead of passing on to the condenser C, may be drawn off, and conveyed elsewhere for mixing with other acid, or for use directly as drawn off. After passing through the filter tower, the filtered vapors and gases pass into the condenser C, where the acid and water vapors may be condensed together, or the mixed vapors and gases may pass into a succession of condensers, the condensing water or other condensing medium being maintained at such temperatures as will produce acids of the strength desired. Thus there may be two condensers arranged in series, the first a warmer and the second a cooler condenser, whereby a highly concentrated acid may be condensed in the first, and a weaker acid in the second; or there may be a series of three condensers, whereby a strong acid may be condensed in the first, a somewhat weaker one in the second and a very weak acid or merely an acidulated water in the third; or any combination of these that may be found desirable. After the removal of the acid and water vapors, as above, the residual gas may be passed on and treated according to the provisions of our previous Patent No. 1,010,221 or in any other manner.

What we claim is:—

1. A process of treating petroleum sludge by removing the excess of organic matter by means of water and exposing the diluted sulfuric acid to rapid distillation at a temperature above the boiling point of sulfuric acid.

2. A process of treating petroleum sludge by removing the excess of organic matter by means of water, exposing the diluted sulfuric acid to rapid distillation at a temperature above the boiling point of sulfuric acid and for a time insufficient to permit the organic matter to reduce the sulfuric acid to sulfurous acid.

3. A process of treating petroleum sludge by separating the excess of tarry matter therefrom by means of water and subjecting the sludge acid so obtained to rapid distillation so as to secure a minimum amount of reduction of the sulfuric acid by the organic matter present in the sludge acid and a maximum amount of hydrated sulfuric acid in the distillate.

In testimony whereof we affix our signatures in presence of two witnesses.

JOHN S. BLOWSKI.
ALFRED A. BLOWSKI.

Witnesses:
ERNEST M. BLAESS,
FRANK C. HODGKISS.